United States Patent
Kim

(10) Patent No.: US 6,204,888 B1
(45) Date of Patent: Mar. 20, 2001

(54) METHOD FOR DISPLAYING PROGRESSIVE DEGREE OF CHANNEL SETTING

(75) Inventor: In-soo Kim, Seoul (KR)

(73) Assignee: Samsung Electronics Co., Ltd., Kyungki-do (KR)

(*) Notice: Subject to any disclaimer, the term of this patent is extended or adjusted under 35 U.S.C. 154(b) by 0 days.

(21) Appl. No.: 09/144,339

(22) Filed: Aug. 31, 1998

(30) Foreign Application Priority Data

Aug. 30, 1997 (KR) .................................................. 97-44522

(51) Int. Cl.⁷ ...................................................... H04N 5/50
(52) U.S. Cl. .......................................... 348/570; 348/731
(58) Field of Search .................................... 348/570, 731, 348/732, 733, 725; H04N 5/44, 5/50

(56) References Cited

U.S. PATENT DOCUMENTS 5,735,035 * 4/1998 Rotzoll .................................. 348/725

* cited by examiner

Primary Examiner—Sherrie Hsia
(74) Attorney, Agent, or Firm—Sughrue, Mion, Zinn, Macpeak & Seas, PLLC

(57) ABSTRACT

A method of displaying a progressive degree of channel setting in a digit vision receiver having automatic channel settings including setting a kind of channel and acquiring the total number of channels corresponding to the kind of the channel which is set. In addition, a start channel is selected and a tested number of channels is obtained by calculating an absolute value of the difference between the start channel and a present channel. Next, a percentage value of the tested number of channels to the total number of channels is calculated and then stored in a memory. The percentage value stored in the memory is then displayed on a display unit to a user enabling the user to determine the current percentage of channels which have been previously selected. Additionally, the method determines whether the present channel is a final channel and increments the channel by one channel when the present channel is not the final channel and returns to the step of calculating the tested number of channels to repeatedly perform the subsequent steps.

8 Claims, 3 Drawing Sheets

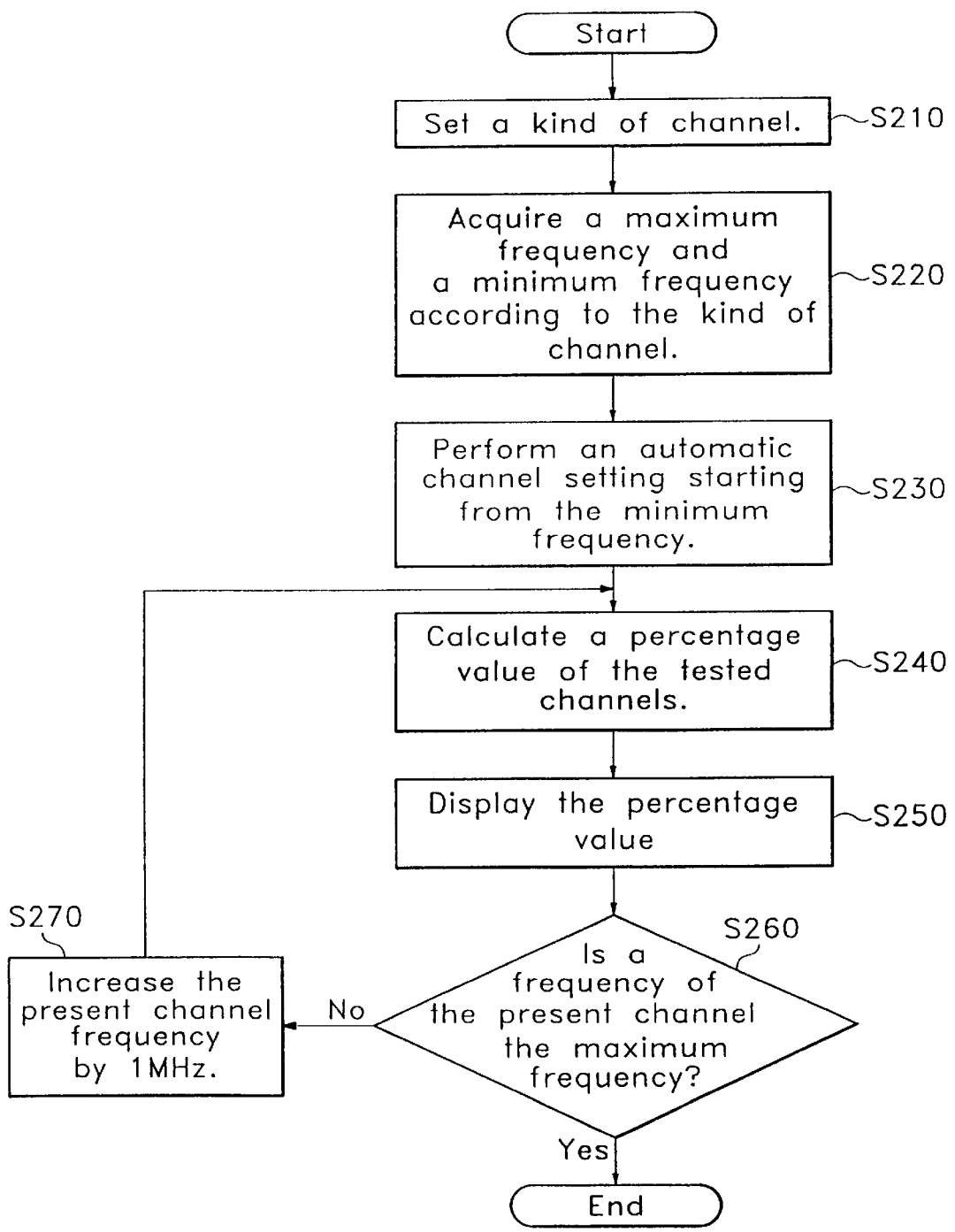

METHOD FOR DISPLAYING PROGRESSIVE DEGREE OF CHANNEL SETTING

BACKGROUND OF THE INVENTION

1. Field of the Invention

The present invention relates to a television receiver, and particularly to a method for displaying a progressive degree of channel setting which informs of a progressive degree of automatic channel setting when an automatic channel setting mode is operated in a television receiver having various channels.

The present application is based upon Korean Application No. 97-44522, which is incorporated herein by reference.

2. Description of the Related Arts

As cable and wireless broadcasting technologies have been developed, television receivers having high performance receive broadcasting signals transmitted through a cable/wireless transmitting unit and then output the received broadcasting signals to users.

Referring to the attached drawings, a process of setting channels automatically in a conventional television receiver is explained. FIG. 1 is a block diagram illustrating the structure of the conventional television receiver. As shown in the drawing, when power is applied to the conventional television receiver, as the user selects a desired channel by pressing a key equipped in a key input unit 20 which is located at a television main body 130 or in a remote controller 30 which is separated from the television main body 130, a selected signal is input to a microcomputer 10 through a remote receiving unit 30a and an on-screen display unit 120 receives a control signal of the microcomputer 10, thereby displaying the selected channel number on the screen of a cathode ray tube 110.

Simultaneously, a tuner 50 receives the control signal of the microcomputer 10 and then outputs a broadcasting signal corresponding to the selected channel out of the broadcasting signals received through an antenna ANT. The broadcasting signal output from the tuner 50 is input to an audio signal processing unit 80 and a video signal processing unit 90 through an intermediate frequency unit 60 for processing an intermediate frequency and a detection unit 70 for detecting the signals.

In addition, the audio signal processing unit 80 processes only audio signals out of combined video signals output from the detection unit 70 and then outputs the processed signals to a speaker 100. The video signal processing unit 90 only processes video signals out of combined video signals output from the detection unit 70 and then outputs the processed signals to the cathode ray tube 110. As a result, viewers can enjoy the video and audio each output from the cathode ray tube 110 and the speaker 100.

In the above-described television receiver, the viewer can select a desired channel using two methods. First, using a number key equipped in the key input unit or the remote controller, the viewer can select the channel by directly inputting the number of the desired channel. Second, using a channel up/down key equipped in the key input unit or the remote controller, the viewer can select the channel by ascending or descending order number neighboring the present channel number.

Conventionally, since the first method is troublesome in inputting the channel number of two digits, the second method is widely used in selecting the channel excluding the case of selecting a channel which is far apart from the present channel.

As the communication types have been developed, with the increase of the communication sources such as the cable television broadcasting in addition to the conventional public television broadcasting, it takes much time to select one channel in watching the television. As a result, an automatic setting function on the channels capable of being selected is required.

Actually, the number of channels capable of being selected in the television receiver is varied according to the kind of a channel. That is, a general channel has 68 channels, i.e., channel 02 to channel 69, and an extended channel has 125 channels, i.e., channel 01 to channel 125. Since it is necessary to store the channels capable of being selected out of a plurality of channels in a memory 40 shown in FIG. 1, the user can select a desired channel by scanning the channels stored in the memory 40 successively. However, in the conventional automatic channel setting method, only one channel which is set automatically is displayed. Accordingly, the user cannot know how many channels have been tested for an automatic setting out of all the channels capable of being selected and must wait until the test is completely performed on all of the channels to know the extent of the automatic set channels.

SUMMARY OF THE INVENTION

Therefore, it is an object of the present invention to provide a method for displaying a progressive degree of automatic channel setting by providing a calculated percentage value of the number of channels which have the automatic setting test on the total number of channels capable of being selected.

According to one aspect of the present invention, the method for displaying a progressive degree of channel setting in a digital television receiver includes the steps of: setting a kind of channel; acquiring the total number of channels corresponding to the kind of the channel which is set; starting an automatic channel setting by selecting a start channel; calculating a tested number of channels by obtaining an absolute value of the difference between the start channel and a present channel; calculating a percentage value of the tested number of channels based on the total number of channels and storing the calculated percentage value in a memory; displaying the percentage value stored in the memory on a predetermined display unit; determining whether the present channel is a final or last channel in the total number of channels; and incrementing the present channel up by one in the case that the present channel is not the final channel and returning to the step of calculating tested number of channels to repeatedly perform the subsequent steps.

Preferably, the total number of channels is 68 in a general channel and 125 in an extended channel. Also, in order to calculate the tested number of channels, a preferable expression of: the percentage value={(|the start channel−the present channel|)/total number of channels}×100 is used. Finally, the display unit preferably consists of a cathode ray tube.

According to another aspect of the present invention, the method for displaying a progressive degree of channel setting in a digital television receiver of a PAL tuner type includes the steps of: setting a kind of channel; acquiring a maximum frequency and a minimum frequency according to the kind of channel which is set; starting an automatic channel setting starting from the minimum frequency; calculating the percentage value of the difference between the present channel frequency and the minimum frequency with respect to the difference between the maximum frequency and the minimum frequency; displaying the calculated percentage value on a predetermined display unit; determining whether the present channel frequency is the maximum frequency; and increasing the present channel frequency by 1 Mhz in the case that the present channel frequency is not the maximum frequency and returning to the step of calculating the percentage value to repeatedly perform the subsequent steps.

Preferably, in order to calculate the percentage value, an expression of: the percentage value={(the present frequency−the minimum frequency)/(the maximum frequency−the minimum frequency)}×100 is used.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein:

FIG. 3 is a flowchart illustrating a method for displaying a progressive degree of channel setting in a television receiver according to another embodiment of the present invention.

DETAILED DESCRIPTION OF THE PREFERRED EMBODIMENTS

The objects, characteristics and advantages of the above-described invention will be more clearly understood through the preferable embodiments referring to the attached drawings.

Figure 1:
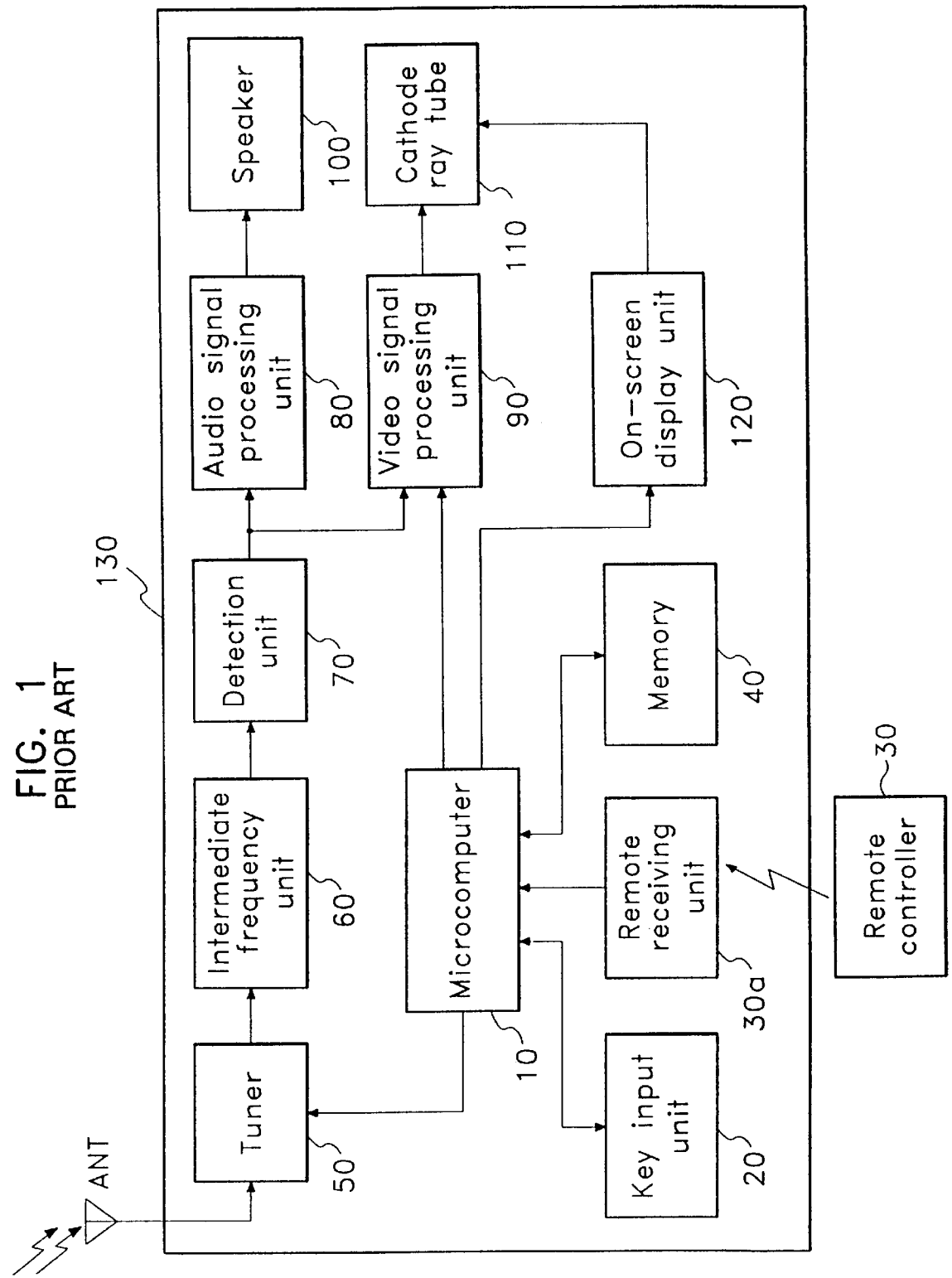
FIG. 1 is a block diagram illustrating a conventional television receiver.
Figure 2:
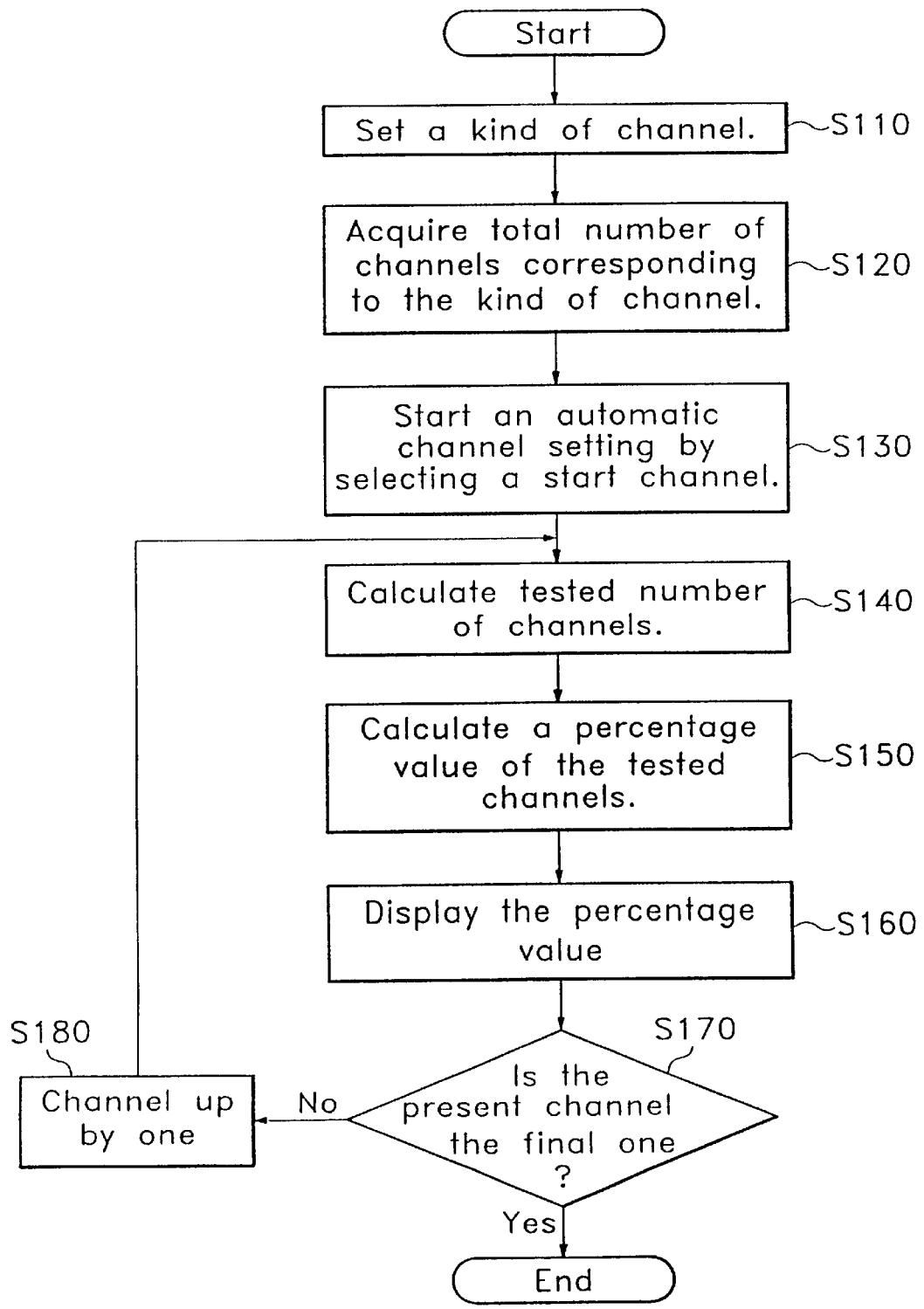
FIG. 2 is a flowchart illustrating a method for displaying a progressive degree of channel setting in a television receiver according to one embodiment of the present invention.

FIG. 2 is a flowchart illustrating a method for displaying a progressive degree of channel setting in a television receiver according to the present invention. Referring to FIG. 2, the method for displaying a progressive degree of channel setting includes the steps of: setting a kind of channel (step 110); acquiring the total number of channels corresponding to the kind of the channel which is set (step 120); starting an automatic channel setting by selecting a start channel (step 130); calculating tested number of channels by obtaining an absolute value of the difference between the start channel and the present channel (step 140); calculating a percentage value of the tested number of channels on the total number of channels and storing the calculated percentage value in a memory (step 150); displaying the percentage value stored in the memory on a predetermined position of a display unit (step 160); determining whether the present channel is a final one (step 170); and incrementing the present channel up by one (step 180) in the case that the present channel is not the final channel and returning to the step 140 to repeatedly perform the subsequent steps S150 through S170.

The method for displaying a progressive degree of channel setting according to one embodiment of the present invention will be explained as follows. First, a user selects a kind of channel using a key input unit 20 or a remote controller 30 (step 110). Preferably, channels are divided into a general channel and an extended channel. The general channel has 68 channels, i.e., channel 02 to channel 69, and the extended channel has 125 channels, i.e., channel 01 to channel 125.

A microcomputer 10 acquires the total number of channels stored in a memory 40 according to the kind of the channel (step 120). For example, in the case that the channel is the general one, the total number of channels is 68. In the case that the channel is the extended one, the total number of channels is 125.

When the user selects a start channel for starting an automatic channel setting using the key input unit 20 or the remote controller 30, the automatic channel setting is performed from the start channel (step 130).

After that, the tested number of channels is calculated by obtaining an absolute value of the difference between the start channel and the present channel (step 140).

After calculating the percentage value of the tested number of the channels based on the total number of channels, the calculated percentage value is stored in the memory 40 (step 150). The formula for calculating the percentage value is as follows:

the percentage value={(|the start channel−the present channel|)/total number of channels}×100.

The microcomputer 10 displays the obtained percentage value at a predetermined position of a cathode ray tube 110 (step 160), and determines whether the present channel is the final channel in the total number of channels (step 170). In other words, since the channel search is performed regarding the total number of channels, a channel just prior to the repeat of the start channel becomes the final channel.

In the case that the present channel is not the final one, the channel is incremented up by one (step 180) and the method is then returned to step 140, thereby repeatedly performing the subsequent steps.

Referring to the attached drawings, a method for displaying progressive degree of channel setting in the television receiver of PAL type. FIG. 3 is a flowchart illustrating the method for displaying a progressive degree of channel setting in the television receiver which is another embodiment of the present invention.

In the case of the television receiver of PAL type, when selecting the automatic channel, the frequency is changed by 1 Mhz, thereby changing the channel.

As shown in FIG. 3, the user selects the kind of channel by the key input unit 20 or the remote controller 30 (step 210). According to the kind of the channel, a maximum frequency and a minimum frequency between which the channel can be changed. According to the kind of the channel, the microcomputer 10. acquires the maximum frequency and the minimum frequency stored in the memory 40 (step 220).

When the user selects an automatic channel setting key by the key input unit 20 or the remote controller 30, the automatic channel setting is performed considering the minimum frequency as a reference value (step 230).

After that, the percentage value of the tested number of channels with respect to the total number of channels capable of being selected by the following formula is calculated, and the calculated percentage value is stored in the memory 40 (step 240):

the percentage value=(the present frequency−the minimum frequency)/(the maximum frequency−the minimum frequency)1×100.

The microcomputer 10 displays the obtained percentage value on a predetermined position of the cathode ray tube 110 (step 250) and determines whether the present channel frequency is the maximum frequency (step 260).

In the case that the present channel frequency is not the final channel frequency, the present channel frequency increases by 1 Mhz (step 270) and the method then returns to the step 240, thereby repeatedly performing the subsequent steps.

As described in the above embodiments, the method of the present invention informs a user of how much of the automatic channel setting with respect to the total number of channels capable of being selected has been performed and users can, therefore, easily predict the time when the automatic channel setting will be completed.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A method for displaying a progressive degree of channel setting in a digital television receiver comprising the steps of:

setting a kind of channel;

acquiring a total number of channels corresponding to the kind of channel which is set;

starting an automatic channel setting by selecting a start channel;

calculating a tested number of channels by obtaining an absolute value of the difference between said start channel and a present channel;

calculating a percentage value of said tested number of channels based on the total number of channels according to a predetermined expression and storing the calculated percentage value in a memory;

displaying the percentage value stored in said memory on a predetermined display means;

determining whether said present channel is a final channel; and incrementing said present channel by one channel in the case that said present channel is not the final channel and returning to said step of calculating a tested number of channels to repeatedly perform the subsequent steps.

2. The method of claim 1, wherein said total number of channels is 68 in a general channel.

3. The method of claim 1, wherein said total number of channels is 125 in an extended channel.

4. The method of claim 1, wherein said predetermined expression is:

the percentage value={(|the start channel−the present channel|)/total number of channels}×100.

5. The method of claim 1, wherein said display means is a cathode ray tube.

6. A method for displaying a progressive degree of channel setting in a digital television receiver of a PAL tuner type comprising the steps of:

setting a kind of channel;

acquiring a maximum frequency and a minimum frequency according to the kind of channel which is set;

starting an automatic channel setting beginning with said minimum frequency;

calculating a percentage value of a first difference between a present channel frequency and said minimum frequency based with respect to a second difference between said maximum frequency and minimum frequency according to a predetermined expression;

displaying said calculated percentage value on a predetermined display means;

determining whether said present channel frequency is said maximum frequency; and increasing said present channel frequency by 1 Mhz in the case that said present channel frequency is not the maximum frequency and returning to said step of calculating the percentage value to repeatedly perform the subsequent steps.

7. The method of claim 6, wherein said predetermined expression is:

the percentage value={(the present frequency−the minimum frequency)/(the maximum frequency−the minimum frequency)}×100.

8. The method of claim 6, wherein said display means is a cathode ray tube.

* * * * *